United States Patent
Kim

(10) Patent No.: US 7,948,527 B2
(45) Date of Patent: May 24, 2011

(54) IMAGE SIGNAL PROCESSOR AND METHOD FOR OUTPUTTING DEFERRED VERTICAL SYNCHRONOUS SIGNAL

(75) Inventor: Wang-Hyun Kim, Seoul (KR)

(73) Assignee: Mtekvision Co., Ltd., Seoul (KR)

( * ) Notice: Subject to any disclaimer, the term of this patent is extended or adjusted under 35 U.S.C. 154(b) by 637 days.

(21) Appl. No.: 12/092,402

(22) PCT Filed: Oct. 31, 2006

(86) PCT No.: PCT/KR2006/004477
§ 371 (c)(1),
(2), (4) Date: May 1, 2008

(87) PCT Pub. No.: WO2007/052934
PCT Pub. Date: May 10, 2007

(65) Prior Publication Data
US 2008/0284865 A1    Nov. 20, 2008

(30) Foreign Application Priority Data
Nov. 2, 2005   (KR) .................. 10-2005-0104610

(51) Int. Cl.
    *H04N 5/228* (2006.01)
(52) U.S. Cl. .................. 348/222.1; 348/390.1
(58) Field of Classification Search ............ 348/222.1, 348/390.1
    See application file for complete search history.

(56) References Cited

U.S. PATENT DOCUMENTS

| | | | |
|---|---|---|---|
| 6,504,855 B1 | 1/2003 | Matsunaga et al. | |
| 7,369,705 B2 * | 5/2008 | Kondo et al. | 382/232 |
| 2002/0196351 A1 | 12/2002 | Noguchi | |
| 2008/0316331 A1 * | 12/2008 | Jun | 348/222.1 |

FOREIGN PATENT DOCUMENTS

| | | |
|---|---|---|
| JP | 10-2000-0055147 A | 9/2000 |
| JP | 11-177520 A | 1/2003 |
| JP | 2003-9002 A | 1/2003 |

* cited by examiner

*Primary Examiner* — Jason Chan
*Assistant Examiner* — Gary C Vieaux
(74) *Attorney, Agent, or Firm* — Birch, Stewart, Kolasch & Birch, LLP

(57) ABSTRACT

A method of transferring a deferred vertical synchronous signal and an image signal processor executing the method thereof are disclosed. Once the vertical synchronous signal for an $m^{th}$ frame is inputted from an encoding unit, the method monitors whether image data columns in the quantity of n corresponding to a predetermined process block have been stored, using a count value inputted from the encoding unit, and outputs a corresponding vertical synchronous signal to a receiving part in case the image data columns in the quantity of n have been stored. Therefore, it becomes possible to increase the process efficiency of the back-end chip and to reduce the power consumption.

12 Claims, 7 Drawing Sheets

IMAGE SIGNAL PROCESSOR AND METHOD FOR OUTPUTTING DEFERRED VERTICAL SYNCHRONOUS SIGNAL

CROSS-REFERENCE TO RELATED APPLICATIONS

This application claims foreign priority benefits under 35 U.S.C. sctn. 119(a)-(d) to PCT/KR2006/004477, filed Oct. 31, 2006, which is hereby incorporated by reference in its entirety.

BACKGROUND

1. Technical Field

The present invention is related to data encoding, more specifically to output of a vertical synchronous signal for transferring encoded data.

2. Description of the Related Art

By mounting a small or thin imaging device on a small or thin portable terminal such as a portable phone or a PDA (personal digital assistant), the portable terminal can now function as an imaging device also. Thanks to this new development, the portable terminal, such as the portable phone, can send not only audio information but also visual information. The imaging device has been also mounted on a portable terminal such as the MP3 player, besides the portable phone and PDA. As a result, a variety of portable terminals can now function as an imaging device, capturing an external image and retaining the image as electronic data.

Generally, the imaging device uses a solid state imaging device such as a CCD (charge-couple device) image sensor or a CMOS (complementary metal-oxide semiconductor) image sensor.

FIG. 1 is a simplified structure of a typical imaging device, and FIG. 2 shows the steps of a typical JPEG encoding process. FIG. 3 shows signal types of a related image signal processor (ISP) for outputting encoded data.

As shown in FIG. 1, the imaging device, converting the captured external image to electronic data and displaying the image on a display unit 150, comprises an image sensor 110, an image signal processor (ISP) 120, a back-end chip 130, a baseband chip 140 and a display unit 150. The imaging device can further comprise a memory, for storing the converted electronic data, and an AD converter, converting an analog signal to a digital signal.

The image sensor 110 has a Bayer pattern and outputs an electrical signal, corresponding to the amount of light inputted through a lens, per unit pixel.

The image signal processor 120 converts raw data inputted from the image sensor 110 to a YUV value and outputs the converted YUV value to the back-end chip. Based on the fact that the human eye reacts more sensitively to luminance than to chrominance, the YUV method divides a color into a Y component, which is luminance, and U and V components, which are chrominance. Since the Y component is more sensitive to errors, more bits are coded in the Y component than in the U and V components. A typical Y:U:V ratio is 4:2:2.

By sequentially storing the converted YUV value in FIFO, the image signal processor 120 allows the back-end chip 130 to receive corresponding information.

The back-end chip 130 converts the inputted YUV value to JPEG or BMP through a predetermined encoding method and stores the YUV value in a memory, or decodes the encoded image, stored in the memory, to display on the display unit 150. The back-end chip 130 can also enlarge, reduce or rotate the image. Of course, it is possible, as shown in FIG. 1, that the baseband chip 140 can also receive from the back-end chip 130, and display on the display unit 150, the decoded data.

The baseband chip 140 controls the general operation of the imaging device. For example, once a command to capture an image is received from a user through a key input unit (not shown), the baseband chip 140 can make the back-end chip 130 generate encoded data corresponding to the inputted external image by sending an image generation command to the back-end chip 130.

The display unit 150 displays the decoded data, provided by the control of the back-end chip 130 or the baseband chip 140.

FIG. 2 illustrates the steps of typical JPEG encoding, carried out by the back-end chip 130. Since the JPEG encoding process 200 is well-known to those of ordinary skill in the art, only a brief description will be provided here.

As illustrated in FIG. 2, the image of the inputted YUV values is divided into a block in the size of 8×8 pixels, and in a step represented by 210, DCT (discrete cosine transform) is performed for each block. The pixel value, which is inputted as an 8-bit integer of between −129 and 127, is transformed to a value between −1024 and 1023 by DCT.

Then, in a step represented by 220, a quantizer quantizes a DCT coefficient of each block by applying a weighted value according to the effect on the visual. A table of this weighted value is called a "quantization table." A quantization table value takes a small value near the DC and a high value at a high frequency, keeping the data loss low near the DC and compressing more data at a high frequency.

Then, in a step represented by 230, the final compressed data is generated by an entropy encoder, which is a lossless coder.

The data encoded through the above steps is stored in a memory. The back-end chip decodes the data loaded in the memory and displays the data on the display unit 150.

Signal types during the steps of sequentially inputting the data, stored in the memory, to process, for example, decoding are shown in FIG. 3. Generally, the back-end chip 130 is realized to receive the YUV/Bayer-format data, and the P_CLK, V_sync, H_REF and DATA signals are used as the interface for receiving this kind of data.

As shown in FIG. 3, the conventional back-end chip 130 maintains the output state of the clock signal (P_CLK) to an "On" state throughout the process of transferring the encoded data to a following element (e.g. a decoding unit), and thus the back-end chip 130 has to carry out an operation for interfacing with the following element while invalid data (e.g. data including 0x00) is inputted.

As a result, the back-end chip 130 of the conventional imaging device consumed unnecessary electric power by carrying out an unnecessary operation.

Moreover, as shown in FIG. 3, the conventional image signal processor 120 may output a new vertical synchronous signal (V_sync2) to the back-end chip 130 although the encoding process on the frame that is currently being processed is not completed.

In this case, the back-end chip 130 sometimes processes not only the frame that is currently being processed but also the next frame, not completing the input and/or process of correct data.

In addition, the conventional image signal processor 120 alternates the output of the H_REF signal, which can be used by the back-end chip 130 when storing data, resulting in power consumption caused by switching of a write enable signal for the back-end chip 130.

SUMMARY

In order to solve the problems described above, the present invention provides a method of transferring a deferred vertical synchronous signal and an image signal processor for performing the method thereof that can increase the process efficiency and reduce power consumption of the back-end chip.

The present invention also provides a method of transferring a deferred vertical synchronous signal and an image signal processor for performing the method thereof that can have the vertical synchronous signal outputted at an optimal point when transferring data encoded by the encoder to a receiving part (e.g. a back-end chip or a baseband chip).

Moreover, the present invention provides a method of transferring a deferred vertical synchronous signal and an image signal processor for performing the method thereof in which the input of processed data for the current frame is not interfered by the input of the vertical synchronous signal indicating the input of a new frame when encoded data is received in the receiving part.

The present invention also provides a method of transferring a deferred vertical synchronous signal and an image signal processor for performing the method thereof that can make the hardware design and control easier by using a general interface structure when the image signal processor provides encoded data to the back-end chip.

The present invention also provides a method of transferring a deferred vertical synchronous signal and an image signal processor for performing the method thereof that can perform a smooth encoding operation by allowing the image signal processor to determine, in accordance with the encoding speed, whether the inputted frame is to be encoded.

Other objects of the present invention will become apparent through the preferred embodiments described below.

To achieve the above objects, an aspect of the present invention features an image signal processor and/or an imaging device having the image signal processor.

According to an embodiment of the present invention, the image signal processor of the imaging device has an encoding unit, which generates encoded image data for a frame by encoding, in accordance with a predetermined process block, an image data column corresponding to an electrical signal inputted from the image sensor, and a data output unit, which outputs to a receiving part, which is a back-end chip or a baseband chip, a vertical synchronous signal (V_sync) for the frame at a point of the encoding unit having stored first image data columns in the quantity of n (a natural number) for the frame in order to process the process block, and outputs to the receiving part encoded image data inputted from the encoding unit. The above n is a natural number between 1 and b, in case the process block is a (a natural number)×b (a natural number).

A clock signal is outputted to the receiving part in a section only to which valid data of the encoded image data are outputted.

Dummy data can be outputted in a section to which valid data of the encoded image data are outputted.

The encoded image data outputted for the frame is between "START MARKER" and "STOP MARKER".

The data output unit can comprise a register outputting the encoded image data inputted from the encoding unit by delaying the output by a predetermined clock.

The data output unit comprises a V_sync generator, which generates and outputs the vertical synchronous signal of high or low state in accordance with a vertical synchronous signal control command, an H_sync generator, which generates and outputs the valid data enable signal of high or low state in accordance with a valid data enable control command, a delay unit, which outputs in accordance with a data output control unit the valid data inputted from the encoding unit as well as invalid data or pre-generated dummy data, and a transmission control unit, which generates and outputs the vertical synchronous signal control command, the valid data enable control command, and the data output control command. The transmission control unit outputs the vertical synchronous signal control command at a point of having stored first image data columns in the quantity of n (a natural number) for the frame using a counter value inputted from the encoding unit.

The valid data enable signal can be interpreted as a write enable signal in the receiving part.

According to another embodiment of the present invention, the image signal processor of the imaging device has a V_sync generator, which generates and outputs a vertical synchronous signal of high or low state in accordance with a vertical synchronous signal control command, an H_sync generator, which generates and outputs a valid data enable signal of high or low state in accordance with a valid data enable control command, a delay unit, which outputs in accordance with a data output control command valid data, invalid data, or pre-generated dummy data inputted from an encoding unit, and a transmission control unit, which generates and outputs the vertical synchronous signal control command, the valid data enable control command, and the data output control command. The transmission control unit outputs the vertical synchronous signal control command at a point of having stored first image data columns in the quantity of n (a natural number) for the frame using a counter value inputted from the encoding unit.

According to another embodiment of the present invention, the image signal processor of an imaging device, comprising an image sensor, an image signal processor, a back-end chip, and a baseband chip, has an encoding unit, which generates encoded image data for a frame by encoding, in accordance with a predetermined process block, an image data column corresponding to an electrical signal inputted from the image sensor, and a data output unit, which outputs to a receiving part, which is a back-end chip or a baseband chip, a vertical synchronous signal (V_sync) for the frame at a point of the encoding unit having stored first image data columns in the quantity of n (a natural number) for the frame in order to process the process block, and outputs to the receiving part encoded image data inputted from the encoding unit. The above n is a natural number between 1 and b, in case the process block is a (a natural number)×b (a natural number).

In order to achieve the above objects, another aspect of the present invention features a method of transferring a deferred vertical synchronous signal executed in an image signal processor and/or a recorded medium recording a program for executing the method thereof.

According to an embodiment of the present invention, the method of transferring a deferred vertical synchronous signal, executed in an image signal processor of an imaging device comprising an image sensor, comprises the steps of being inputted with a vertical synchronous signal for an $m^{th}$ frame from an encoding unit, whereas m is a natural number, monitoring, using a count value inputted from the encoding unit, whether image data columns in the quantity of n (a natural number) corresponding to a predetermined process block have been stored, and outputting to a receiving part, which is a back-end chip or a baseband chip, a vertical synchronous signal corresponding to the $m^{th}$ frame in case the image data columns in the quantity of n have been stored. The above n is a natural number between 1 and b, in case the process block is a (a natural number)×b (a natural number).

The method can further comprise the steps of being inputted with encoded data from the encoding unit in accordance with the process block and outputting the inputted encoded data to the receiving part. A clock signal can be outputted to the receiving part in a section only to which valid data of the encoded image data are outputted.

Completion of encoding the $m^{th}$ frame can be determined by using header information and tail information of the inputted encoded data.

DETAILED DESCRIPTION

Figure 1:
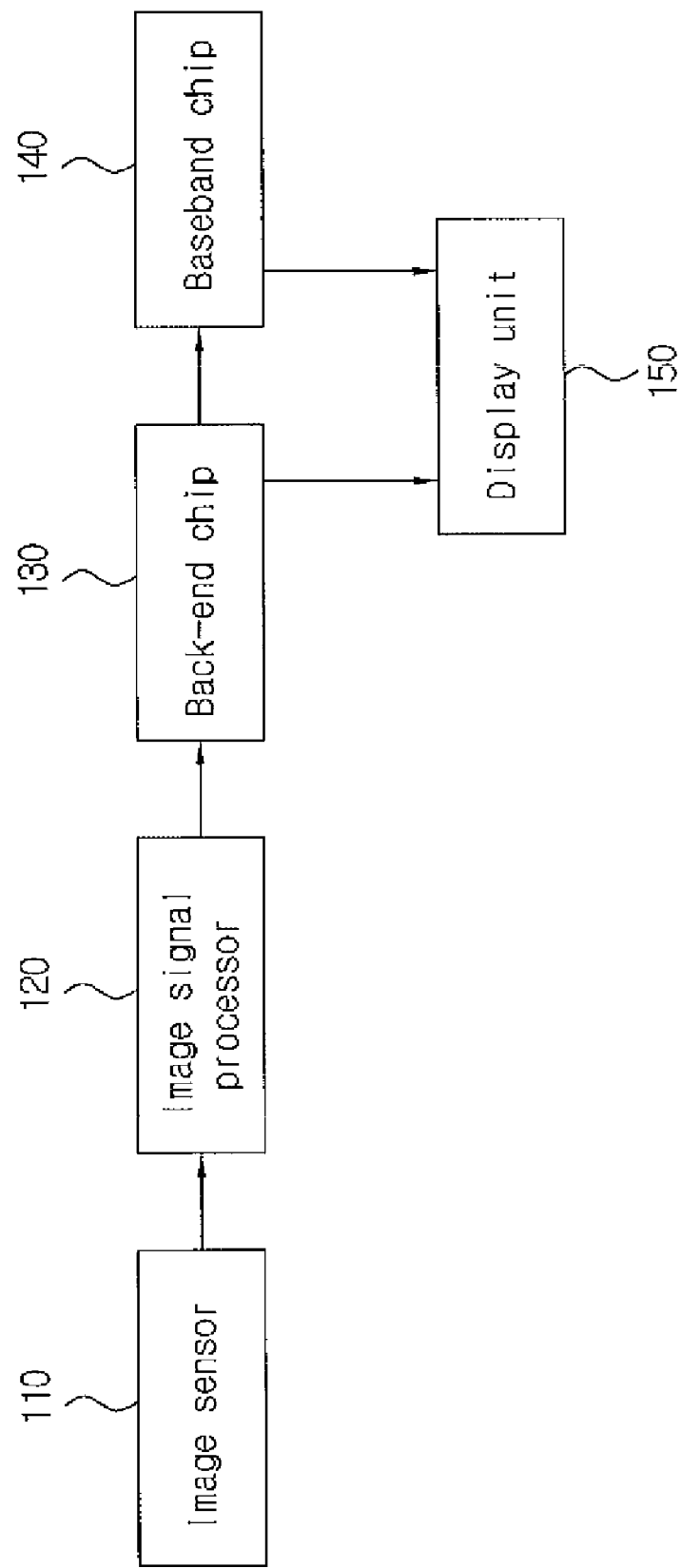
FIG. 1 shows a simple structure of a typical imaging device.
Figure 2:
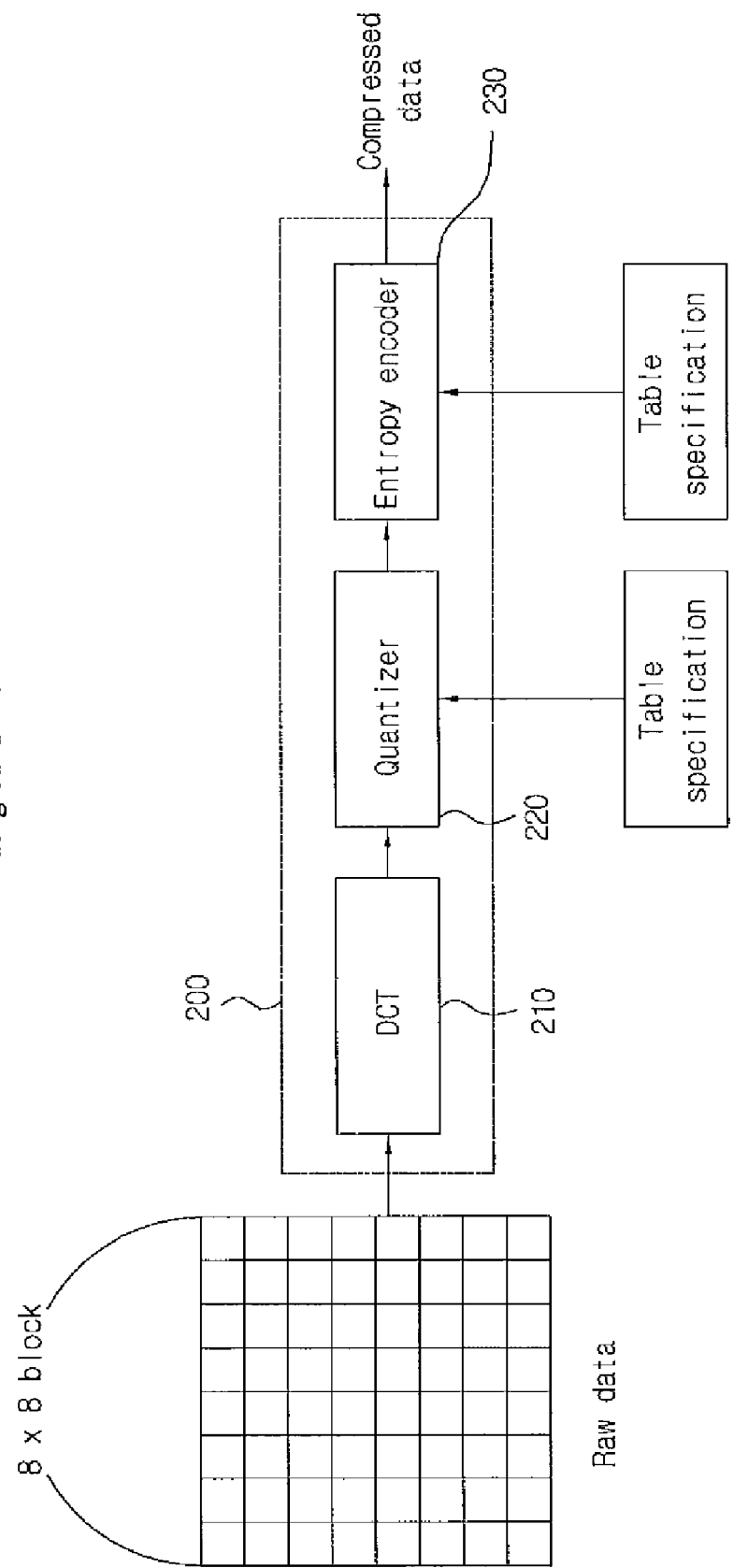
FIG. 2 shows the steps of typical JPEG encoding.
Figure 3:
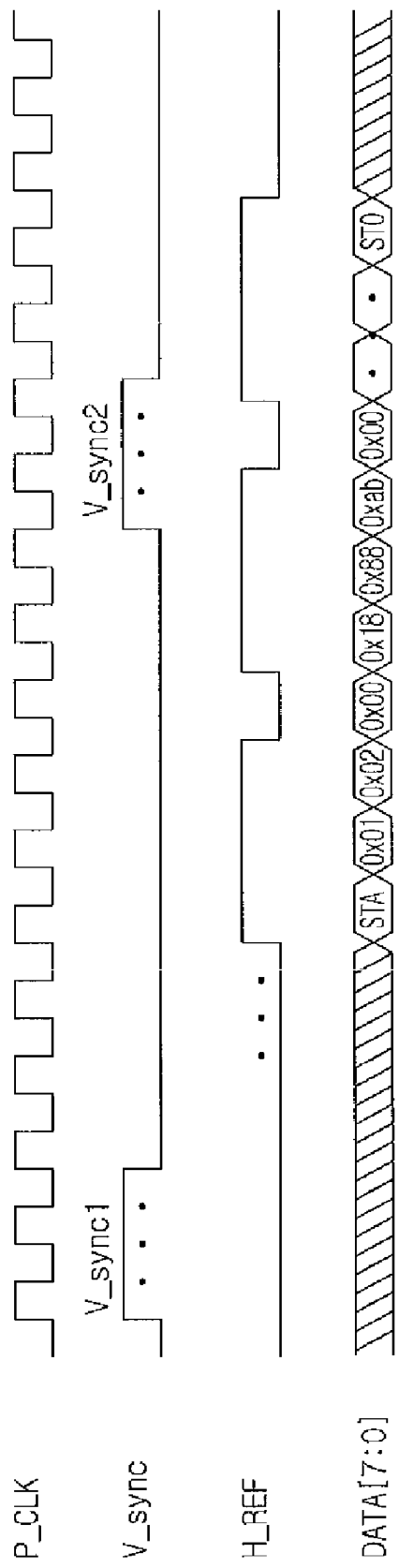
FIG. 3 shows signal types for which a conventional image signal processor outputs encoded data.

The above objects, features and advantages will become more apparent through the below description with reference to the accompanying drawings.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, preferred embodiments will be described in detail with reference to the accompanying drawings. Identical or corresponding elements will be given the same reference numerals, regardless of the figure number, and any redundant description of the identical or corresponding elements will not be repeated.

In describing the embodiments of the present invention, the process operation of the image signal processor, which is the core subject of the invention, will be described. However, it shall be evident that the scope of the present invention is by no means restricted by what is described herein.

Figure 4:
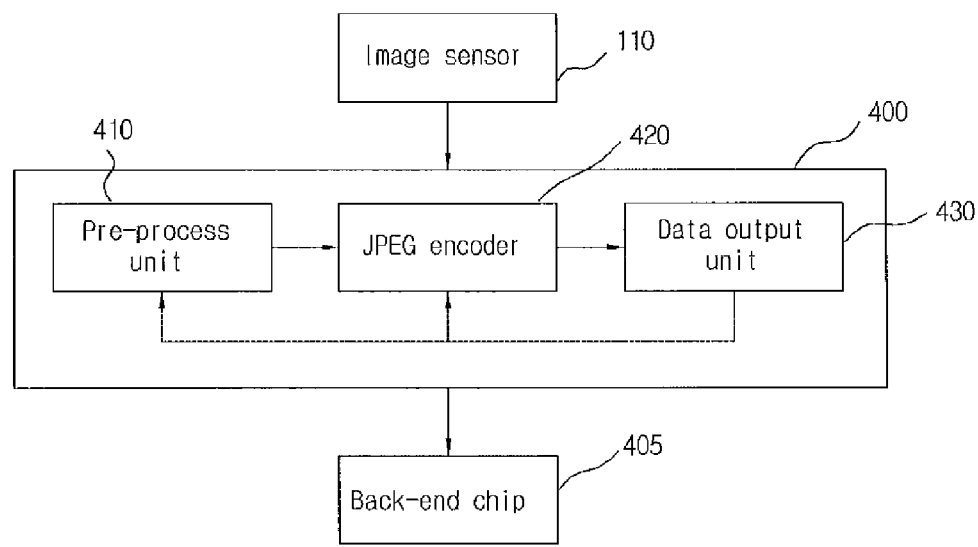
FIG. 4 shows the block diagram of an imaging device in accordance with an embodiment of the present invention.
Figure 5:
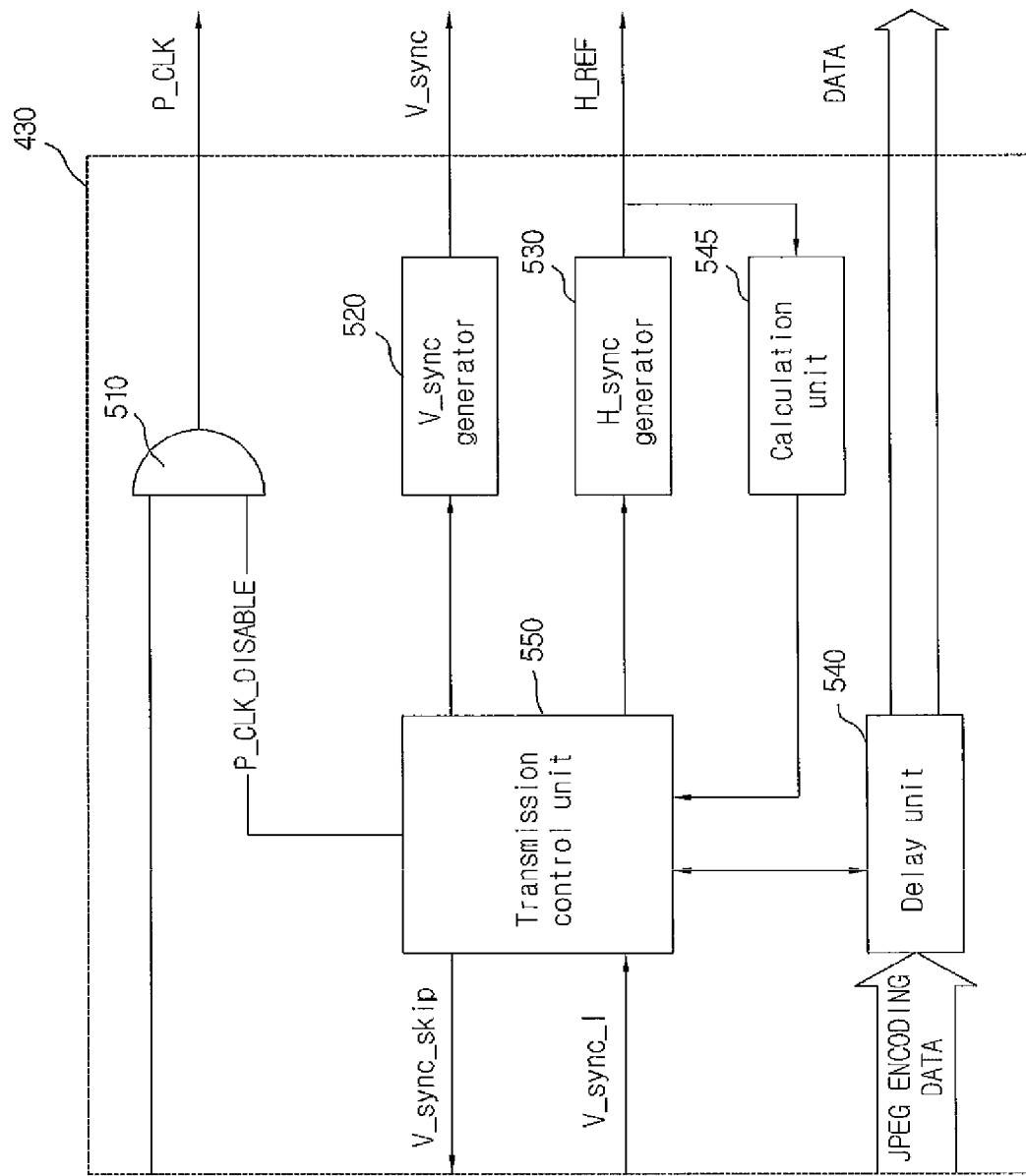
FIG. 5 shows the block diagram of a data output unit in accordance with an embodiment of the present invention.
Figure 6:
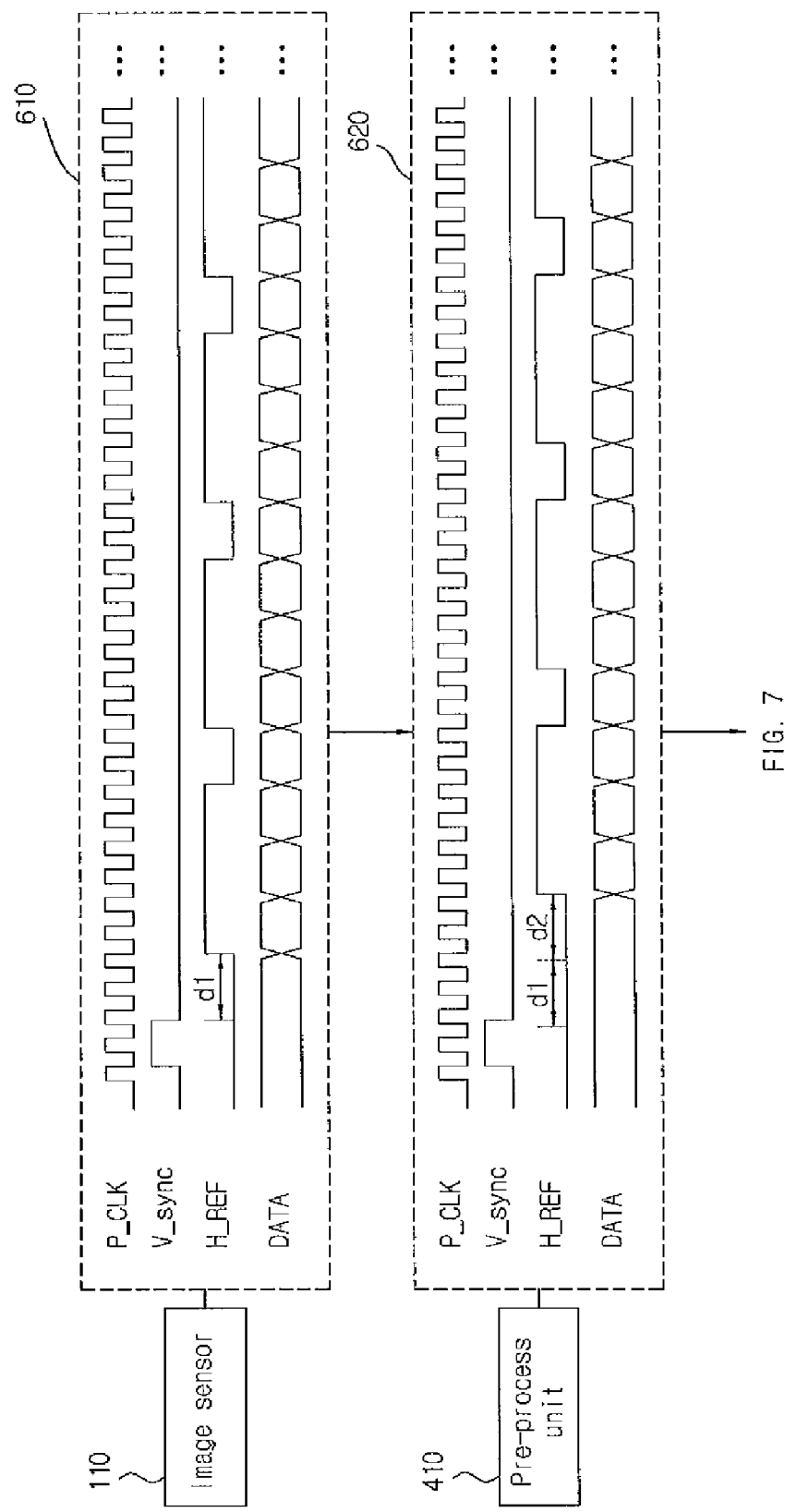
FIG. 6 and FIG. 7 show signal types for which an image signal processor outputs encoded data in accordance with an embodiment of the present invention.
Figure 7:
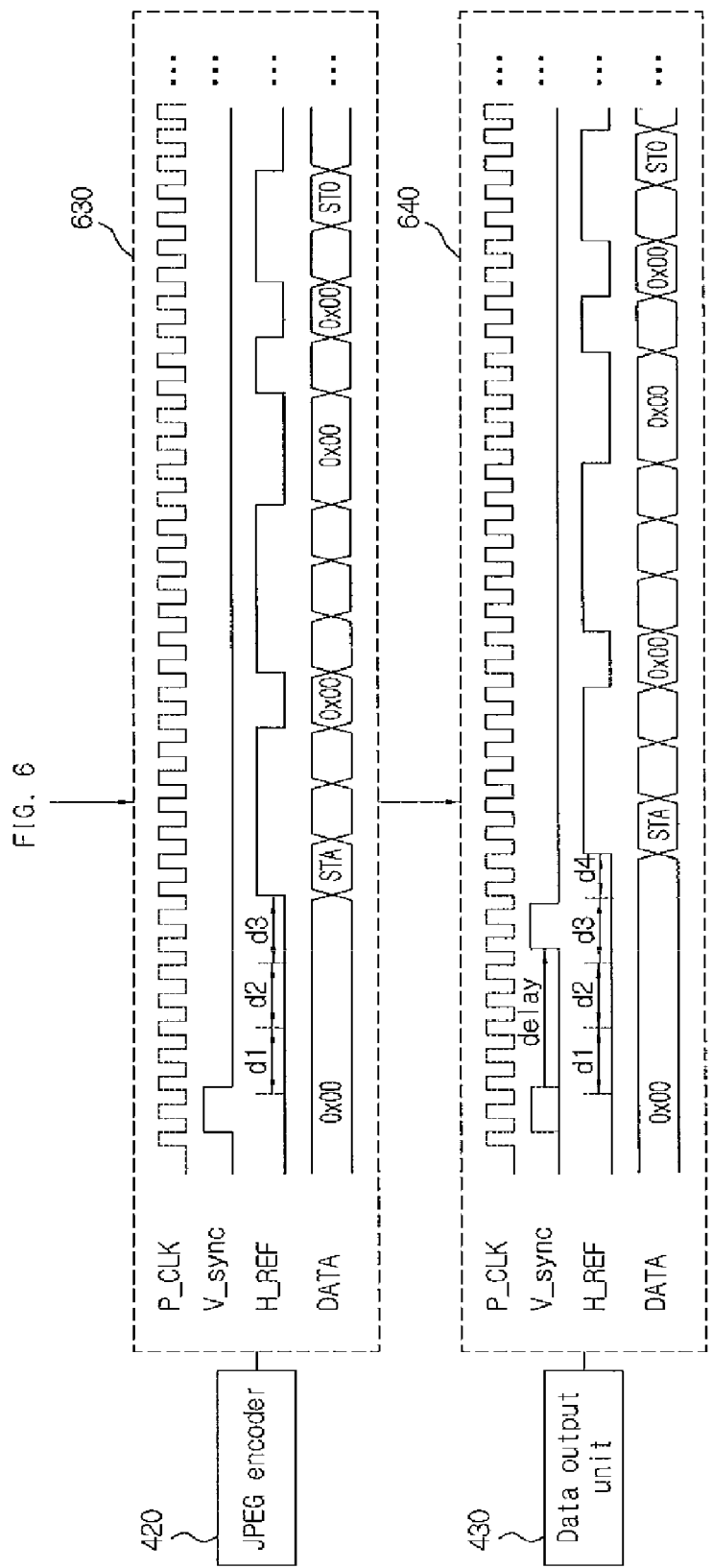

FIG. 4 shows the block diagram of an imaging device in accordance with an embodiment of the present invention; FIG. 5 shows the block diagram of a data output unit 430 in accordance with an embodiment of the present invention; and FIG. 6 and FIG. 7 show signal types for which an image signal processor outputs encoded data in accordance with an embodiment of the present invention.

As shown in FIG. 4, the imaging device can comprise an image sensor 110, an image signal processor 400 and a back-end chip 405. Although it is evident that the imaging device can further comprise a display unit 150, a memory, a baseband chip 140 and a key input unit, these elements are somewhat irrelevant to the present invention and hence will not be described herein.

The image signal processor 400 comprises a pre-process unit 410, a JPEG encoder 420 and a data output unit 430. The image signal processor 400 can of course further comprise a clock generator for internal operation.

The pre-process unit 410 performs pre-process steps in preparation for the process by the JPEG encoder 420. The pre-process unit 410 can receive from the image sensor 110 and process an electrical signal type of raw data for each frame per line, and then can transfer the raw data to the JPEG encoder 420.

The pre-process steps can comprise at least one of the steps consisting of color space transformation, filtering and color subsampling.

The color space transformation transforms an RGB color space to a YUV (or YIQ) color space. This is to reduce the amount of information without recognizing the difference in picture quality.

The filtering is a step of smoothing the image using a lowpass filter in order to increase the compression ratio.

The color subsampling subsamples the chrominance signal component by using all of the Y value, some of other values and none of the remaining values.

The JPEG encoder 420 compresses the preprocessed raw data, as in the method described earlier, and generates JPEG encoded data.

The JPEG encoder 420 can comprise a memory for temporarily storing the processed raw data inputted from the pre-process unit 410 to divide the raw data into predetermined block units (e.g. 8×8) for encoding. Unlike the pre-process unit 410, the JPEG encoder 420 can perform buffering until the data in the predetermined block units are accumulated in the input memory, and can further comprise a counter for counting the number of lines accumulated in the input memory. The counted value (L_count, hereinafter referred to as "count value") counted by the counter is delivered to the data output unit 430 to have an output point of the vertical synchronous signal (V_sync) determined.

The JPEG encoder 420 can further comprise an output memory, which temporarily stores JPEG encoded data prior to outputting the JPEG encoded data to the data output unit 430. The output memory can be, for example, a FIFO. In other words, the image signal processor 400 of the present invention can also encode image data, unlike the conventional image signal processor 120.

The data output unit 430 transfers the JPEG encoded data, generated by the JPEG encoder 420, to a receiving part (e.g. the back-end chip 405, the baseband chip 140, or the camera control processor, hereinafter referred to as "back-end chip" 405). The data output unit 430 can comprise, for example, a register for delaying the data inputted from the JPEG encoder 420 for predetermined duration (e.g. 2-3 clocks) before outputting the data.

The data output unit 430 outputs the JPEG encoded data, inputted from the JPEG encoder 420, to the back-end chip 405, not in accordance with the vertical synchronous signal (V_sync) inputted from, for example, the image sensor 110, but in accordance with whether the JPEG encoder 420 is ready to start the encoding operation.

In other words, the data output unit 430 determines whether the JPEG encoder 420 is ready to process the encoding operation of the corresponding frame, prior to outputting a vertical synchronous signal to notify the back-end chip 405 that the data for a new frame will be outputted.

For example, since the JPEG encoder 420 will perform the encoding operation in units of 8×8 blocks when 8 lines of data columns are stored in the input memory, the data output unit 430 can determine that the encoding operation is ready to be started if 1 to 8 lines (preferably 6 to 7 lines) of data columns are stored in the input memory when the count value (L_count) is referred.

Through this, the data output unit 430 can start outputting the encoded data in a short time after the vertical synchronous signal is outputted, and controls the clock signal (P_CLK) and the valid data enable signal (H_REF) in a high state (or a low state, depending on the design) to be outputted to the back-end chip 405 in a section in which valid data are outputted among the outputted encoded data.

The case of the back-end chip recognizing that valid data are inputted among the JPEG encoded data, in case the H_REF signal is high, will be described.

If a command to, for example, capture a picture is received from the baseband chip 140, which controls the general operation of the portable terminal, the back-end chip 405 receives and stores in the memory the picture-improved JPEG encoded data, which is inputted from the image signal processor 400, and then decodes and displays the data on the display unit 150, or the baseband chip 140 reads and processes the data.

The detailed structure of the data output unit 430 is illustrated in FIG. 5.

Referring to FIG. 5, the data output unit 430 comprises an AND gate 510, the V_sync generator 520, an H_sync generator 530, the delay unit 540 and a transmission control unit 550.

The AND gate 510 outputs a clock signal (P_CLK) to the back-end chip 405 only if every input is inputted with a signal. That is, by receiving the clock signal from a clock generator (not shown), disposed in the image signal processor 400, and receiving a clock control signal from the transmission control unit 550, the AND gate 510 outputs the clock signal to the back-end chip 405 only when the clock control signal instructs the output of the clock signal. The clock control signal can be a high signal or a low signal, each of which can be recognized as a P_CLK enable signal or a P_CLK disable signal. Of course, the reverse case is possible. As shown in FIG. 7, the section in which P_CLK is outputted to the back-end chip 405 coincides with a section in which valid data is outputted among the JPEG encoded data. It shall be evident to anyone of ordinary skill in the art that the output signal of the AND gate 510 can be controlled because the transmission control unit 550 can identify whether the encoded data to be currently outputted is valid data or invalid data.

The V_sync generator 520 generates and outputs the vertical synchronous signal (V_sync) for displaying a valid section, by the control of the transmission control unit 550. The V_sync generator 520 outputs a high state of V_sync signal until an output termination command of the V_sync signal is inputted by the transmission control unit 550 after an output command of the V_sync signal is inputted. Of course, it shall be evident that a low state of V_sync signal can be outputted, depending on the design method. This is because the high state or low state of V_sync signal can be defined at discretion. It shall be evident to anyone skilled in the art that the vertical synchronous signal means the start of input of each frame.

The H_sync generator 530 generates and outputs a valid data enable signal (H_REF) by the control of the transmission control unit 550 (i.e. until an output termination command of H_REF is inputted after an output command of H_REF is inputted). The high section (or a low section, depending on the design method, as described earlier) of the valid data enable signal coincides with the output section in which the JPEG encoded data on one frame is outputted from the delay unit 540. It shall be evident to anyone of ordinary skill in the art that the output signal of the H_sync generator 530 can be controlled because the transmission control unit 550 can identify whether the encoded data to be currently outputted is valid data or invalid data.

The delay unit 540 sequentially outputs the JPEG encoded data, inputted from the JPEG encoder 420, during a section in which H_REF is outputted in a high state. The delay unit 540 can comprise, for example, a register for delaying the data inputted from the JPEG encoder 420 for predetermined duration (e.g. 2-3 clocks) before outputting the data.

Whether the JPEG encoded data stored in the delay unit 540 is valid can be determined by the transmission control unit 550. In case the data to be currently outputted is invalid data (e.g. data including 0x00), the transmission control unit 550 can control the AND gate 510 to have the clock signal not outputted to the back-end chip 405, and control the H_sync generator 530 to have a low state of H_REF signal outputted.

Invalid data mentioned in this description refers to what is described in, for example, the JPEG standard as data that is not valid (i.e. data not actually forming an image), and is sometimes expressed as 0x00.

The pre-stored dummy data (i.e. data only for meeting the format) can be outputted in the section in which invalid data are outputted. A multiplexer (MUX) can be also placed before the delay unit, through which the JPEG encoded data and dummy data are outputted, and the delay unit 540 receives these JPEG encoded data and dummy data to output. In this case, the transmission control unit 550 can input a dummy data output command to the MUX if the transmission control unit 550 determines that the inputted JPEG encoded data is invalid data. The MUX shall then be able to have pre-designated dummy data input to the delay unit 540 and output to the back-end chip 405.

The transmission control unit 550 can recognize the information on the start and end of JPEG encoding by capturing "START MARKER" and "STOP MARKER" from the header and tail of the JPEG encoded data that the delay unit 540 sequentially receives from the JPEG encoder 430 and temporarily stores for outputting valid data. Through this, it becomes possible to recognize whether one frame is completely encoded and/or outputted by the JPEG encoder 420.

FIG. 6 and FIG. 7 show the types of signal outputted by each element. FIG. 6 shows signal types 610 and 620 outputted by the image sensor 110 and the pre-process unit 410, and FIG. 7 shows signal types 630 and 640 outputted by the JPEG encoder 420 and the data output unit 430. FIG. 6 and FIG. 7 only show the delayed time in each element, not the delayed time for communicating a signal between each element.

As shown in FIG. 6, the image sensor outputs the V_sync signal 110 and then starts to output raw data after a predetermined delay time of d1.

The signal outputted by the image sensor 110 is inputted to the pre-process unit 410, which performs the buffering and/or process for the delay time of d2 in order to conduct a process, such as filtering and interpolation, before outputting the processed data to the JPEG encoder 420.

To conduct a process in the predetermined block units, the JPEG encoder 420 stores in the input memory the processed data, which are inputted from the pre-process unit 410. It takes the delay time of d3 for the data to be stored in the input memory such that the process can be conducted in the predetermined block units. The data stored in the input memory are counted in units of lines, and the count value (L_count) is inputted in real time to the transmission control unit 550.

Before the delay time of d3 is finished (e.g. before 7 lines of data are stored), the data output unit 430 outputs to the back-end chip 405 the V_sync signal for a frame that is currently processed by the JPEG encoder 420. That is, as shown in FIG. 7, the output of the V_sync signal for the corresponding frame is delayed.

Then, the data output unit 430 temporarily stores in the register the encoded data inputted from the JPEG encoder 420 and then outputs the data sequentially. The process can be delayed for the delay time of d4 while the encoded data are written in the register and outputted.

In the related art, the encoded data were outputted only after the delay time of e (i.e. e=a+b+c+d) has been spent after outputting the V_sync signal. However, if the V_sync signal for the $(k+1)^{th}$ frame, whereas k is a natural number, is inputted while the encoded data for the $k^{th}$ frame is outputted, the encoded data for the $k^{th}$ frame could not be properly received by the receiving part after the V_sync signal for the $(k+1)^{th}$ frame is inputted.

On the other hand, the data output unit 430 of the present invention can solve the problem of getting normal data communication interfered by the V_sync signal for the $(k+1)^{th}$ frame while the $k^{th}$ frame is processed, since the data output unit 430 can start to output the encoded data within a short time, through the steps described above, after outputting the V_sync signal to the back-end chip 405.

At this time, the data output unit 430 can maintain the H_REF signal high only when the outputted encoded data is valid data, and can have the clock signal outputted to the back-end chip 405 in the corresponding section only. As such, while invalid encoded data or dummy data is being outputted, the clock signal (P_CLK) to be outputted to the back-end chip 405 is turned off (the dotted sections of P_CLK in FIG. 7), and hence any unnecessary operation can be minimized, minimizing the power consumption of the back-end Chip 405.

The conventional back-end chip 405 is embodied to receive the YUV/Bayer format of data, and uses the P_CLK, V_sync, H_REF and DATA signals as the interface for receiving these data.

Considering this, the image signal processor 400 of the present invention is embodied to use the same interface as the conventional image signal processor.

Therefore, it shall be evident that the back-end chip 405 of the present invention can be port-matched although the back-end chip 405 is embodied through the conventional method of designing back-end chip.

For example, if the operation of a typical back-end chip 405 can be said to be initialized from an interrupt of the rising edge of the V_sync signal, the interfacing between the chips is possible, similar to outputting the conventional V_sync signal, in the present invention by inputting the corresponding signal to the back-end chip 405, since the conventional interface structure is identically applied to the present invention.

Likewise, considering that the typical back-end chip 405 must generate the V_sync rising interrupt and that the valid data enable signal (H_REF) is used as a write enable signal of the memory when data is received from the image signal processor 400, the power consumption of the back-end chip 405 can be reduced by using the signal output method of the present invention.

Hitherto, although the image signal processor 400 using the JPEG encoding method has been described, it shall be evident that the same data transmission method can be used for other encoding methods, such as the BMP encoding method, MPEG (MPEG 1/2/4 and MPEG-4 AVC) encoding and TV-out method.

As described above, the present invention can increase the process efficiency and reduce power consumption of the back-end chip.

The present invention can also have the vertical synchronous signal outputted at an optimal point when transferring data encoded by the encoder to a receiving part (e.g. a back-end chip or a baseband chip).

Moreover, with the present invention, the input of processed data for the current frame is not interfered by the input of the vertical synchronous signal indicating the input of a new frame when encoded data is received in the receiving part.

Moreover, the present invention can make the hardware design and control easier by using a general interface structure when the image signal processor provides encoded data to the back-end chip.

Furthermore, the present invention enables a smooth encoding operation by allowing the image signal processor to determine, in accordance with the encoding speed, whether the inputted frame is to be encoded.

The drawings and detailed description are only examples of the present invention, serve only for describing the present invention and by no means limit or restrict the spirit and scope of the present invention. Thus, any person of ordinary skill in the art shall understand that a large number of permutations and other equivalent embodiments are possible. The true scope of the present invention must be defined only by the spirit of the appended claims.

What is claimed is:

1. An image signal processor of an imaging device, the image signal processor comprising:

an encoding unit, generating encoded image data for a frame by encoding, in accordance with a predetermined process block, an image data column corresponding to an electrical signal inputted from the image sensor; and a data output unit, outputting to a receiving part, which is a back-end chip or a baseband chip, a vertical synchronous signal (V_sync) for the frame at a point of the encoding unit having stored first image data columns in the quantity of n (a natural number) for the frame in order to process the process block, and outputting to the receiving part encoded image data inputted from the encoding unit, whereas said n is a natural number between 1 and b, in case the process block is a (a natural number)×b (a natural number).

2. The image signal processor of claim 1, wherein a clock signal is outputted to the receiving part in a section only to which valid data of the encoded image data are outputted.

3. The image signal processor of claim 1, wherein dummy data are outputted in a section to which valid data of the encoded image data are outputted.

4. The image signal processor of claim 1, wherein the encoded image data outputted for the frame is between "START MARKER" and "STOP MARKER".

5. The image signal processor of claim 1, wherein the data output unit comprises a register outputting encoded image data inputted from the encoding unit by delaying the output by a predetermined clock.

6. The image signal processor of claim 1, wherein the data output unit comprises:

a V_sync generator, generating and outputting the vertical synchronous signal of high or low state in accordance with a vertical synchronous signal control command;

an H_sync generator, generating and outputting the valid data enable signal of high or low state in accordance with a valid data enable control command;

a delay unit, outputting in accordance with a data output control command valid data inputted from the encoding unit as well as invalid data or pre-generated dummy data; and a transmission control unit, generating and outputting the vertical synchronous signal control command, the valid data enable control command, and the data output control command, whereas the transmission control unit outputs the vertical synchronous signal control command at a point of having stored first image data columns in the quantity of n (a natural number) for the frame using a counter value inputted from the encoding unit.

7. The image signal processor of claim 6, wherein the valid data enable signal is interpreted as a write enable signal in the receiving part.

8. An image signal processor of an imaging device, the image signal processor comprising:

a V_sync generator, generating and outputting a vertical synchronous signal of high or low state in accordance with a vertical synchronous signal control command;

an H_sync generator, generating and outputting a valid data enable signal of high or low state in accordance with a valid data enable control command;

a delay unit, outputting in accordance with a data output control command valid data, invalid data, or pre-generated dummy data inputted from an encoding unit; and a transmission control unit, generating and outputting the vertical synchronous signal control command, the valid data enable control command, and the data output control command, whereas the transmission control unit outputs the vertical synchronous signal control command at a point of having stored first image data columns in the quantity of n (a natural number) for the frame using a counter value inputted from the encoding unit.

9. An imaging device, comprising an image sensor, an image signal processor, a back-end chip, and a baseband chip, wherein the image signal processor comprises:

an encoding unit, generating encoded image data for a frame by encoding, in accordance with a predetermined process block, an image data column corresponding to an electrical signal inputted from the image sensor; and a data output unit, outputting to a receiving part, which is a back-end chip or a baseband chip, a vertical synchronous signal (V_sync) for the frame at a point of the encoding unit having stored first image data columns in the quantity of n (a natural number) for the frame in order to process the process block, and outputting to the receiving part encoded image data inputted from the encoding unit, whereas said n is a natural number between 1 and b, in case the process block is a (a natural number)×b (a natural number).

10. A method of transferring a deferred vertical synchronous signal, the method executed in an image signal processor of an imaging device comprising an image sensor, the method comprising:

being inputted with a vertical synchronous signal for an $m^{th}$ frame from an encoding unit, whereas m is a natural number;

monitoring, using a count value inputted from the encoding unit, whether image data columns in the quantity of n (a natural number) corresponding to a predetermined process block have been stored; and outputting to a receiving part, which is a back-end chip or a baseband chip, a vertical synchronous signal corresponding to the $m^{th}$ frame in case the image data columns in the quantity of n have been stored, whereas said n is a natural number between 1 and b, in case the process block is a (a natural number)×b (a natural number).

11. The method of claim 10, further comprising:

being inputted with encoded data from the encoding unit in accordance with the process block; and outputting the inputted encoded data to the receiving part, whereas a clock signal is outputted to the receiving part in a section only to which valid data of the encoded image data are outputted.

12. The method of claim 11, wherein completion of encoding the $m^{th}$ frame is determined by using header information and tail information of the inputted encoded data.

* * * * *